Sept. 20, 1932.    J. S. PARKER    1,878,312
CHAIN BLOCK
Filed Feb. 26, 1931
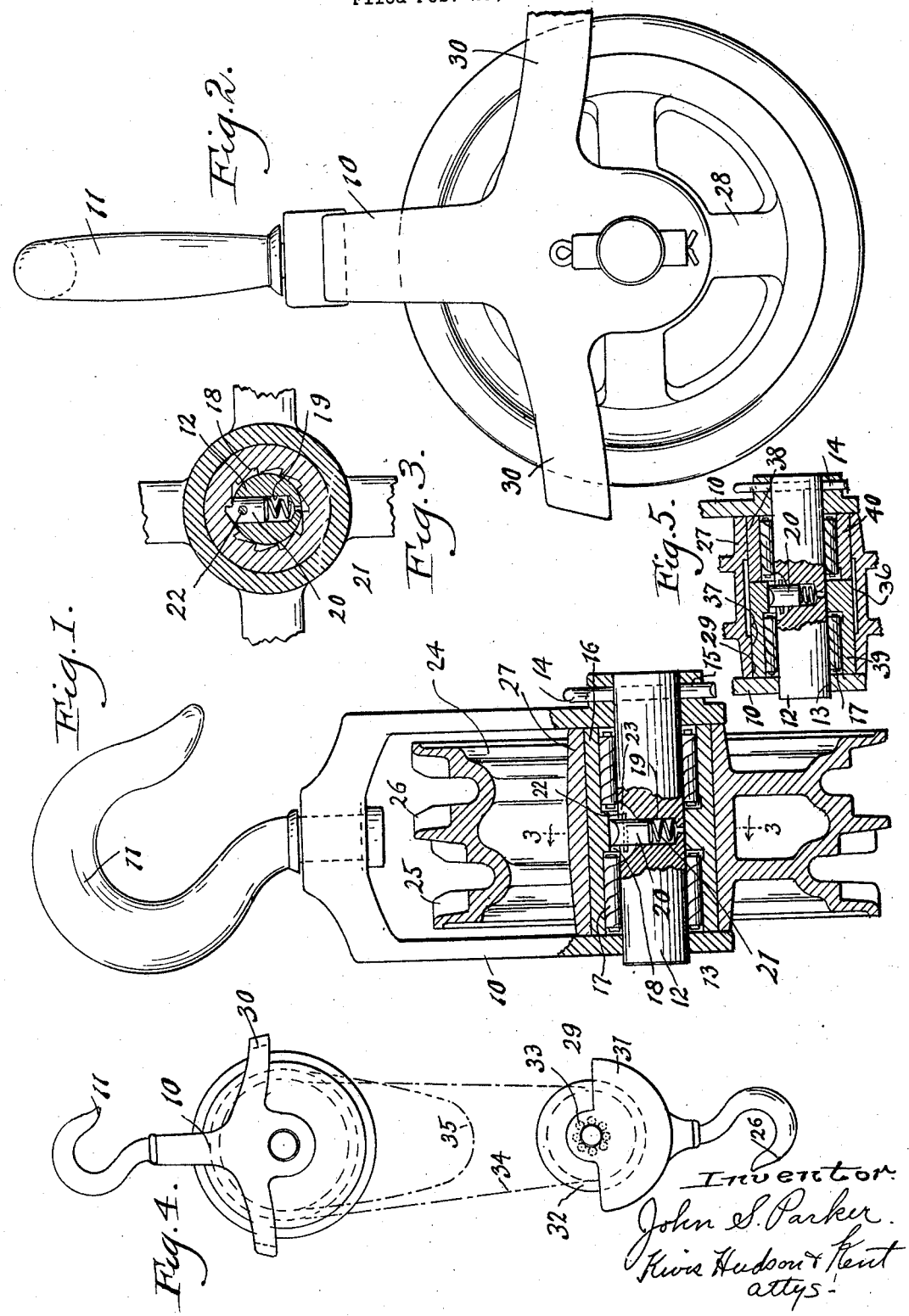
Inventor
John S. Parker
Kwis Hudson & Kent
attys.

Patented Sept. 20, 1932

1,878,312

UNITED STATES PATENT OFFICE

JOHN S. PARKER, OF CLEVELAND, OHIO

CHAIN BLOCK

Application filed February 26, 1931. Serial No. 518,423.

This invention relates to chain blocks and more particularly to a differential type of chain block and has for its primary object to provide a chain block of materially increased efficiency at low manufacturing cost.

The efficiency of chain blocks of the present construction is very low and has but two redeeming features, its capability of supporting its load and the cheapness of its manufacture. Inasmuch as the load is supported by frictional resistance, the same frictional resistance must necessarily be overcome in raising the load to the desired height with the result that a great amount of energy and labor is required, thus reducing the efficiency of the chain block.

It is a further object of the present invention to provide a construction wherein the load may be raised to the desired height without any appreciable resistance and the load supported by sufficient frictional resistance to prevent its lowering by reason of its own weight.

With the objects above indicated and other objects hereinafter explained in view the invention consists in the construction and combination of elements hereinafter described and claimed.

Referring to the drawing:—

Figure 1 is an end elevational view of a chain block partly in vertical section to more clearly illustrate the invention.

Fig. 2 is a side elevational view of the chain block shown in Figure 1.

Fig. 3 is a fragmentary transverse sectional view taken on line 3—3 of Fig. 1.

Fig. 4 illustrates a hoisting apparatus of which the hoist block embodying the present invention is a part.

Fig. 5 is a fragmentary sectional view similar to Fig. 2 but showing a modified construction embodying the present invention.

In the drawing the chain block embodying the invention, comprises a yoke 10 preferably in the form of a metal casting, which is open at its lower end and has swivelly connected at its upper or opposite end a hook 11. A pin or supporting member 12 is disposed within transversely aligned openings 13 provided in the lower portion of the yoke 10 and is secured against rotation and displacement by a cotter pin 14 which extends through aligned openings provided in an integral extension 15 and the adjacent end of the pin 12. A cylindrical bearing member 16 is disposed axially of the pin 12 and is rotatably mounted on a pair of longitudinally spaced anti-friction roller bearings 17 disposed between the inner surface of the cylindrical bearing member 16 and the outer surface of the pin 12. This bearing member 16 is normally free to rotate in one direction but is prevented from rotation in the opposite direction and while any suitable means may be employed to accomplish this result it is preferred to provide a plurality of clutch teeth 18 formed upon the inner surface of the bearing member 16 between the inner adjacent ends of the roller bearings 17. The pin 12 is provided with a transversely extending bore 19 within which is slidably mounted a detent or dog 20 which is adapted to normally engage the internal teeth 18 and which is held in engagement therewith by a coil spring 21 disposed between the inner end of the detent and the base of the bore 19. A pin 22 extends transversely through an opening in the detent 20 and has its ends extending beyond the detent and adapted to engage with a portion 23 formed upon the pin 12 to prevent abnormal depression of the detent 20. Viewing Fig. 3 more particularly it will be noted that the internal teeth 18 and the detent 20 cooperate in a manner which permits relative rotation in a clockwise direction between the pin 12 and the bearing member 16 but which prevents relative rotation therebetween in a counter-clockwise direction. During the rotation of the bearing member 16 in a clockwise direction it is to be noted that the bearing member is anti-frictionally supported upon the pin 12 with the result that practically all frictional resistance is eliminated.

A double sprocket wheel 24 is herein illustrated, but it should be understood that other types of sprocket wheels may be employed if desired, and consists of a pair of chain receiving grooves 25 and 26 being in the present instance of different diameters. The sprocket wheel 24 is provided axially with a hub 27 supported by integral spokes 28. This hub 27 has an axially or longitudinally extending bore 29 of a diameter slightly greater than the outside diameter of the bearing member 16 which is normally disposed therein and functions as a bearing for the sprocket wheel. Sufficient frictional resistance between the hub and the bearing member 16 should be maintained, the amount being dependent upon the capacity of the load inasmuch as the frictional resistance between the hub 27 and the bearing member 16 maintains the load in its suspended position.

The yoke 10 has a pair of laterally extending portions 30 which enclose portions of the sprocket wheel 24 and prevent accidental disengagement between the chain and the sprocket wheel.

In Fig. 4 there is illustrated the upper chain block embodying the present invention and a lower chain block 31 which is of the usual construction except that the sheave or sprocket wheel 32 is mounted for rotation on an anti-friction bearing 33. While this particular type of mounting is not the subject matter of the present invention it is to be pointed out that the efficiency of the hoisting apparatus is materially increased when the sheave of the lower chain block is anti-frictionally mounted. An endless hand chain 34 is employed for raising and lowering the load and at its lower end extends about the lower sheave 32 while its upper end passes around the receiving groove 26 of the upper sprocket wheel 24, is looped down at 35 and subsequently passes around the chain groove 25 of the upper sprocket wheel 24. It will therefore be readily seen that pulling upon the looped portion 35 of the chain 34 in one direction will raise the load supported upon the hook 36 of the lower chain block 31 while pulling the chain in the opposite direction will lower the load.

In the types of differential chain blocks which are manufactured at present the load is frictionally resisted and supported in any desired position in such a manner to prevent the load from lowering by reason of its own weight. Therefore, it follows that in order to raise the load to the desired height, sufficient energy and labor must be exercised to overcome this frictional resistance. It will therefore be readily understood that chain blocks of this particular construction are materially inefficient in this respect. This invention has overcome this objection by permitting the load to be raised in an unresisted manner by virtue of the roller bearings 17 and subsequently prevents lowering of the load by reason of its own weight through frictional resistance between the sprocket wheel 24 and the bearing member 16.

In operating the bearing block to raise the load the looped portion 35 of the endless hand chain 34 is pulled so as to rotate the sprocket wheel 24 in a clockwise direction. The internal teeth 18 on the bearing member 16 therefore slide over the detent 20 which offers no resistance and rotation is unrestricted and requires a minimum amount of energy due to the roller bearings 17. The frictional resistance between the sprocket wheel 24 and the bearing member 16 is sufficient to cause these members to be rotated in unison when the bearing member 16 is rotated in a clockwise direction. When the load has been raised to the desired height the weight of the load itself tends to settle or lower, in which case the bearing member 16 starts to rotate in a counter-clockwise direction. This movement however is prevented by engagement of the detent 20 with the internal teeth 18 on the bearing member 16 and any lowering of the load is prevented by reason of the frictional resistance between the sprocket wheel 24 and the bearing 16. The raising of the load is also assisted by means of the roller bearings 33 upon which the lower sheave 32 is mounted thus eliminating any frictional resistance at this point.

In Fig. 5 I have shown a modified construction of the chain block embodying the invention wherein any desired amount of frictional resistance may be obtained.

The bore 29 of the hub 27 is provided with a circumferentially extending groove 36 adjacent its center portion and of the desired width so as to provide adjacent bearing surfaces 37 and 38. A circular bearing element similar to the bearing member 16 in Fig. 1 is provided and consists in separate but cooperating members 39 and 40 engageable with the bearing portions 37 and 38 respectively. These members 39 and 40 are rotatably supported on anti-friction roller bearings 17 which in turn are supported upon the pin 12 which has its ends non-rotatably mounted in the openings 13 provided in the arms of the yoke 10.

The member 39 in the present instance is provided with a plurality of internal teeth 18 normally engaged by the detent 20 against the tension of the spring 21. The operation is precisely the same as the device illustrated in Fig. 2.

However if the frictional resistance occurs only between the surface 37 and the member 39 it will be apparent that by changing the contacting area of these engaging surfaces any desired amount of frictional resistance may be obtained.

While I have described the preferred embodiments of the invention it is to be understood that I am not to be limited thereto inasmuch as changes and modifications may be resorted to without departing from the spirit of the invention as defined in the appended claims.

Having thus described my invention I claim:

1. In a chain block, a rotatable chain member, a stationary supporting member about which said chain member rotates, and a member mounted for substantially unresisted rotation in one direction upon said supporting member, said member in turn frictionally resisting the rotation of said chain member in one direction.

2. In a chain block, a rotatable chain member, a stationary supporting member about which said chain member rotates, a member mounted for substantially unresisted rotation in one direction upon said supporting member and providing a friction bearing for said chain member in its rotation relatively to said member, and means for maintaining said member against rotation in the opposite direction.

3. In a chain block, a yoke, a stationary supporting member carried by said yoke, a member mounted for rotation in one direction upon said supporting member, means for preventing rotation of said member in its opposite direction, and a frictionally resisted chain engaging member rotatably mounted on said member.

4. In a chain block, a yoke, a stationary supporting member carried by said yoke, a member anti-frictionally mounted for rotation in one direction upon said supporting member, means for preventing rotation of said member in the opposite direction, and a frictionally resisted chain engaging member rotatably mounted on said member.

5. In a chain block, a yoke, a stationary supporting member carried by said yoke, a member anti-frictionally mounted for rotation upon said supporting member, interengaging means between said supporting member and said member for maintaining said member against rotation in one direction, and a rotatable chain engaging member mounted on said member, said chain member being frictionally resisted in its rotation in one direction relatively to said member and rotatable with said member in its rotation in the opposite direction.

6. In a chain block, a rotatable chain member having an axial bore comprising longitudinally spaced bearing surfaces, a stationary supporting member about which said chain member rotates, a member mounted for substantially unrestricted rotation in one direction upon said supporting member and engageable with said spaced bearing surfaces to provide frictional resistance to relative rotation between said members, and means for maintaining said members against rotation in the opposite direction.

7. In a chain block, a rotatable chain member having an axial bore comprising a bearing surface of less length than the length of said bore, a stationary supporting member about which said chain member rotates, a member mounted for substantially unrestricted rotation in one direction upon said bearing surface to provide frictional resistance to relative rotation between said members, and means for maintaining said members against rotation in the opposite direction.

In testimony whereof, I hereunto affix my signature.

JOHN S. PARKER.